（12) United States Patent
Tenny et al.

(10) Patent No.: US 12,219,625 B2
(45) Date of Patent: Feb. 4, 2025

(54) CONNECTION ESTABLISHMENT FOR LAYER 2 UE-TO-NETWORK RELAY (71) Applicant: MediaTek Singapore Pte. Ltd., Singapore (SG)

(72) Inventors: Nathan Edward Tenny, San Jose, CA (US); Xuelong Wang, Beijing (CN); Guan-yu Lin, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 405 days.

(21) Appl. No.: 17/474,866

(22) Filed: Sep. 14, 2021

(65) Prior Publication Data
US 2022/0086931 A1  Mar. 17, 2022

Related U.S. Application Data (63) Continuation of application No. PCT/CN2020/115020, filed on Sep. 14, 2020.

(51) Int. Cl.
*H04W 76/14* (2018.01)
*H04W 8/00* (2009.01)
*H04W 68/00* (2009.01)
*H04W 80/02* (2009.01)
*H04W 92/18* (2009.01)

(52) U.S. Cl.
CPC ........... *H04W 76/14* (2018.02); *H04W 8/005* (2013.01); *H04W 68/005* (2013.01); *H04W 80/02* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2019/0380120 A1* | 12/2019 | Nair | H04B 7/15 |
| 2020/0077460 A1* | 3/2020 | Hahn | H04W 76/14 |
| 2020/0120728 A1* | 4/2020 | Wallentin | H04W 88/04 |
| 2021/0212151 A1* | 7/2021 | Paladugu | H04W 76/28 |

(Continued)

OTHER PUBLICATIONS

Taiwan IPO, office action for the Taiwanese patent application 110134249 (no English translation is available) dated Apr. 18, 2022 (7 pages).

(Continued)

*Primary Examiner* — Srinivasa R Reddivalam
(74) *Attorney, Agent, or Firm* — Helen Mao; Zheng Jin; Imperium Patent Works (57) ABSTRACT A method of connection establishment through a relay UE for a remote UE is proposed. The remote and relay UEs first perform discovery and establish a PC5 radio resource control (PC5-RRC) connection. Upon receiving a request from the remote UE, the relay UE and a serving gNB perform a relaying procedure for establishment of the remote UE's signalling radio bearer 1 (SRB1). The relay UE configures PC5 RLC channels for relaying of SRB1 towards the remote UE. The remote UE then enters an RRC_CONNECTED state. The remote UE and gNB establish security. The gNB configures additional data radio bearers (DRBs) for relaying. The relay UE configures PC5 RLC channels for relaying of the additional DRBs towards the remote UE. The DRBs can then be used for exchange of data between the remote UE and the gNB.

20 Claims, 6 Drawing Sheets (56) References Cited

U.S. PATENT DOCUMENTS

2023/0073469 A1\* 3/2023 Wang .................... H04W 40/22
2023/0145738 A1\* 5/2023 Yang .................... H04W 76/14
370/315

OTHER PUBLICATIONS

Huawei, HiSilicon, "study aspects of UE-to-Network relay and solutions for L2 relay", 3GPP TSG-RAN WG2 Meeting #111-e Online, R2-2008047, Sec.2.2 Figures 7-8, dated Aug. 17-28 (12 pages).

\* cited by examiner

USER PLANE PROTOCOL STACK

FIG. 5A

CONTROL PLANE PROTOCOL STACK

CONNECTION ESTABLISHMENT FOR LAYER 2 UE-TO-NETWORK RELAY

CROSS REFERENCE TO RELATED APPLICATIONS

This application is filed under 35 U.S.C. § 111(a) and is based on and hereby claims priority under 35 U.S.C. § 120 and § 365(c) from international application No. PCT/CN2020/115020, entitled "Connection establishment for layer 2 UE-to-Network relay," filed on Sep. 14, 2020. This application claims priority under 35 U.S.C. § 119 from Chinese Application Number 202111070164.8, entitled "Connection establishment for layer 2 UE-to-Network relay", filed on Sep. 13, 2021. The disclosure of each of the foregoing documents is incorporated herein by reference.

TECHNICAL FIELD

The disclosed embodiments relate generally to wireless network communications, and, more particularly, to UE-to-Network relaying in 5G new radio (NR) wireless communications systems.

BACKGROUND

In 3GPP LTE cellular networks, an evolved universal terrestrial radio access network (E-UTRAN) includes a plurality of base stations, e.g., evolved Node-Bs (eNodeBs or eNBs) communicating with a plurality of mobile stations referred as user equipment (UEs). New technologies in 5G new radio (NR) allow cellular devices to connect directly to one another using a technique called sidelink communications. Sidelink is the new communication paradigm in which cellular devices are able to communicate without their data via the network. The sidelink interface may also be referred to as a PC5 interface. A variety of applications may rely on communication over the sidelink interface, such as vehicle-to-everything (V2X) communication, public safety (PS) communication, direct file transfer between user devices, and so on.

The relaying concept uses a so-called "relay UE" interposed between the network and a "remote UE", which may be in poor network coverage or out of coverage entirely. The relay UE operates to relay communications between the remote UE and the network, thus allowing the network to effectively extend its coverage to the remote UE. In a sidelink UE-to-network relaying architecture, a relay UE is served directly by a network node such as an eNB (LTE) or a gNB (NR), and the relay UE offers service over a sidelink interface to one or more remote UEs.

The architecture may perform relaying at either layer 2—for instance, with relaying located between a radio link control (RLC) layer and a packet data convergence protocol (PDCP) layer of a protocol stack—or layer 3, with relaying at an internet protocol (IP) layer of a protocol stack. In the case of a layer 3 relaying architecture, the remote UE may not have a radio resource control (RRC) connection with the network, meaning that there is no interaction between a base station of the network (for example, a gNB) and the remote UE. By contrast, in the layer 2 architecture, the RRC protocol layer is terminated between the gNB and the remote UE, and to communicate with the network, the remote UE in a layer 2 design requires an RRC connection. This disclosure describes means of establishing such a connection "through the relay", i.e., using the relay UE for all communication between the remote UE and the network.

There are well-known methods of establishing an RRC connection through direct communication on the Uu interface between the gNB and a UE. However, when a remote UE is out of coverage (OOC), these methods are clearly not applicable, and even when in coverage of the network, it may be preferable for a remote UE to use a "through-the-relay" mode of connection establishment. This is because the remote UE's coverage may be poor (resulting in a need to retransmit messages over the air interface, with attendant costs in interference and capacity), and also because it may be expedient from a standardisation or implementation point of view for the remote UE to have a single common procedure for connection establishment, applicable in or out of coverage.

Accordingly, a method of connection establishment through a relay UE for a remote UE is needed.

SUMMARY

A method of connection establishment through a relay UE for a remote UE is proposed. The remote UE is in RRC_IDLE state and the relay UE is in RRC_CONNECTED state. (It is noted that a relay UE in RRC_IDLE or RRC_INACTIVE state may be able to transition to RRC_CONNECTED state in order to apply the described method, using existing mechanisms for a UE state transition.) The remote and relay UEs first perform discovery and establish a PC5 radio resource control (PC5-RRC) connection. Upon receiving a request from the remote UE, the relay UE and a serving gNB perform a relaying procedure for establishment of the remote UE's signalling radio bearer 1 (SRB1). The relay UE configures PC5 RLC channels for relaying of SRB1 towards the remote UE. The remote UE then enters an RRC_CONNECTED state. The remote UE and gNB establish security. The gNB configures additional data radio bearers (DRBs) for relaying. The relay UE configures PC5 RLC channels for relaying of the additional DRBs towards the remote UE. The DRBs can then be used for exchange of data between the remote UE and the gNB.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
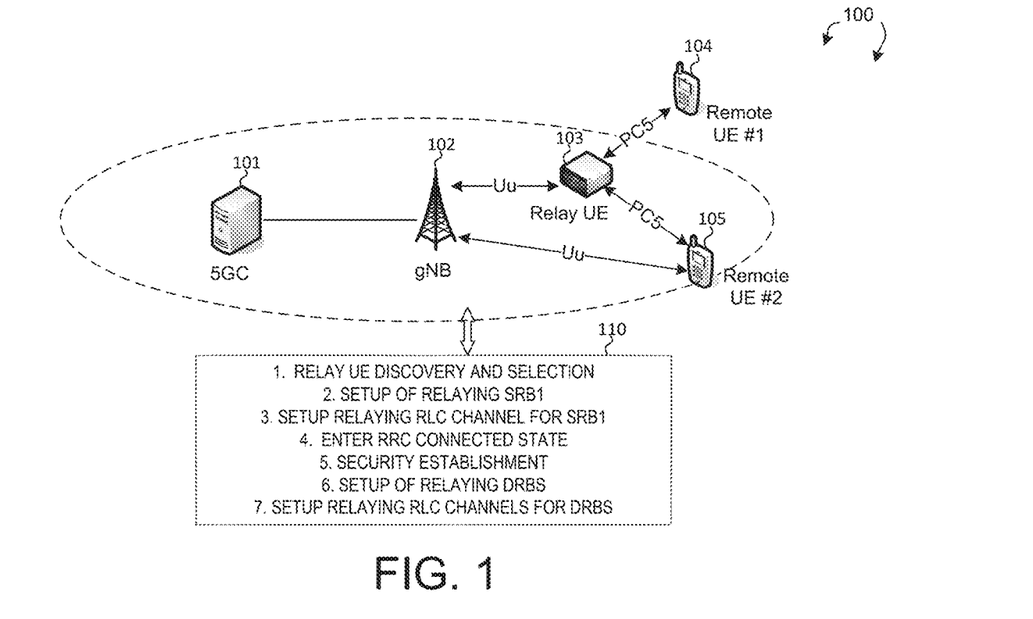
FIG. 1 illustrates a wireless cellular communications system supporting UE-to-network relay for connection establishment for a remote UE via a relay UE in accordance with a novel aspect.

FIG. 1 illustrates a wireless cellular communications system 100 supporting UE-to-network relay for connection establishment for a remote UE via a relay UE in accordance with a novel aspect. 5G new radio (NR) mobile communication network 100 comprises a 5G core (5GC) 101, a base station gNodeB (gNB) 102, and a plurality of user equipments UE 103, UE 104, and UE 105. For in-coverage UEs, a base station can schedule data traffic over Uu link. For out-of-coverage UEs, a relay UE can schedule data traffic over PC5 (or sidelink). In FIG. 1, UE 103 is a radio resource control (RRC)-connected UE that acts as a mobile device relay using PC5 (or sidelink) to relay data traffic to/from end remote UEs for coverage extension. Remote UE 104 is not directly connected to the network. Relay UE 103 helps to relay all data traffic for remote UE 104. Remote UE 105 is directly connected to the network via Uu link but the link quality may be poor. Relay UE 103 helps to relay part or all data traffic for remote UE 105. Relay UE 103 operates to relay communications between UE 104/105 and the network, thus allowing the network to effectively extend its coverage to the remote UEs.

When a remote UE in a layer 2 relaying architecture needs to communicate with the network, it requires an RRC connection to manage the communication. There are well-known methods of establishing an RRC connection through direct communication on Uu interface between gNB and UE. However, when a remote UE is out of coverage, these methods are clearly not applicable, and even when in coverage of the network, it may be preferable for a remote UE to use a "through-the-relay" mode of connection establishment. This is because the remote UE's coverage may be poor (resulting in a need to retransmit messages over the air interface, with attendant costs in interference and capacity), and also because it may be expedient from a standardisation or implementation point of view to have a single common procedure for connection establishment, applicable in or out of coverage.

In accordance with one novel aspect, a method of connection establishment through a relay UE for a remote UE is proposed. This application describes a connection establishment procedure suitable for a layer 2 UE-to-network relay architecture using the NR sidelink for communication between a remote UE and a gNB. As depicted in 110, the remote and relay UEs perform discovery and establish a PC5-RRC connection (1); the relay UE and gNB perform a relaying procedure to set up relaying for the remote UE's SRB1 (2); the relay UE configures PC5 RLC channels for relaying of SRB1 towards the remote UE (3); the remote UE enters an RRC_CONNECTED state (4); the remote UE and gNB establish security (5); gNB configures additional DRBs for relaying (6); the relay UE configures PC5 RLC channels for relaying of the additional DRBs towards the relay UE (7).

Figure 2:
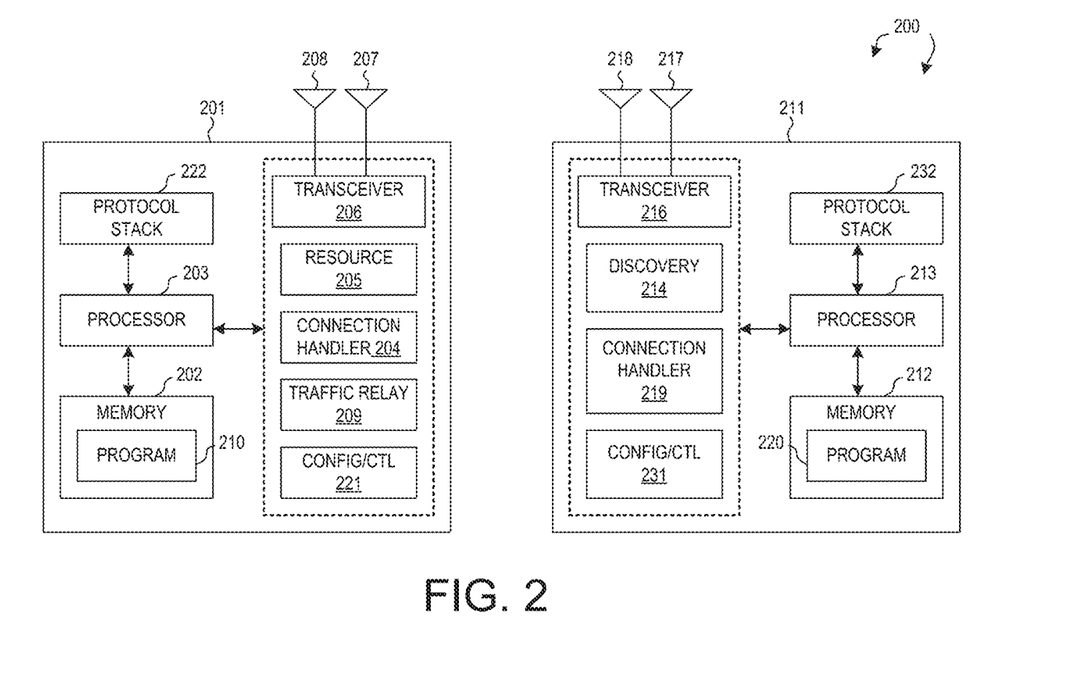
FIG. 2 is a simplified block diagram of a wireless transmitting device and a receiving device in accordance with embodiments of the current invention.

FIG. 2 is a simplified block diagram of wireless devices 201 and 211 in accordance with a novel aspect. For wireless device 201 (e.g., a relay UE), antennae 207 and 208 transmit and receive radio signals. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote UE), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay UE that includes a protocol stack 222, a resource management circuit 205 for allocating and scheduling sidelink resources, a connection handling circuit 204 for establishing and managing connections, a traffic relay handling controller 209 for relaying all or part of control signalling and/or data traffic for remote UEs, and a control and configuration circuit 221 for providing control and configuration information. Wireless device 211 is a remote UE that includes a protocol stack 232, a relay discovery circuit 214 for discovering relay UEs, a connection handling circuit 219 for establishing and managing connections, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly.

Figure 3:
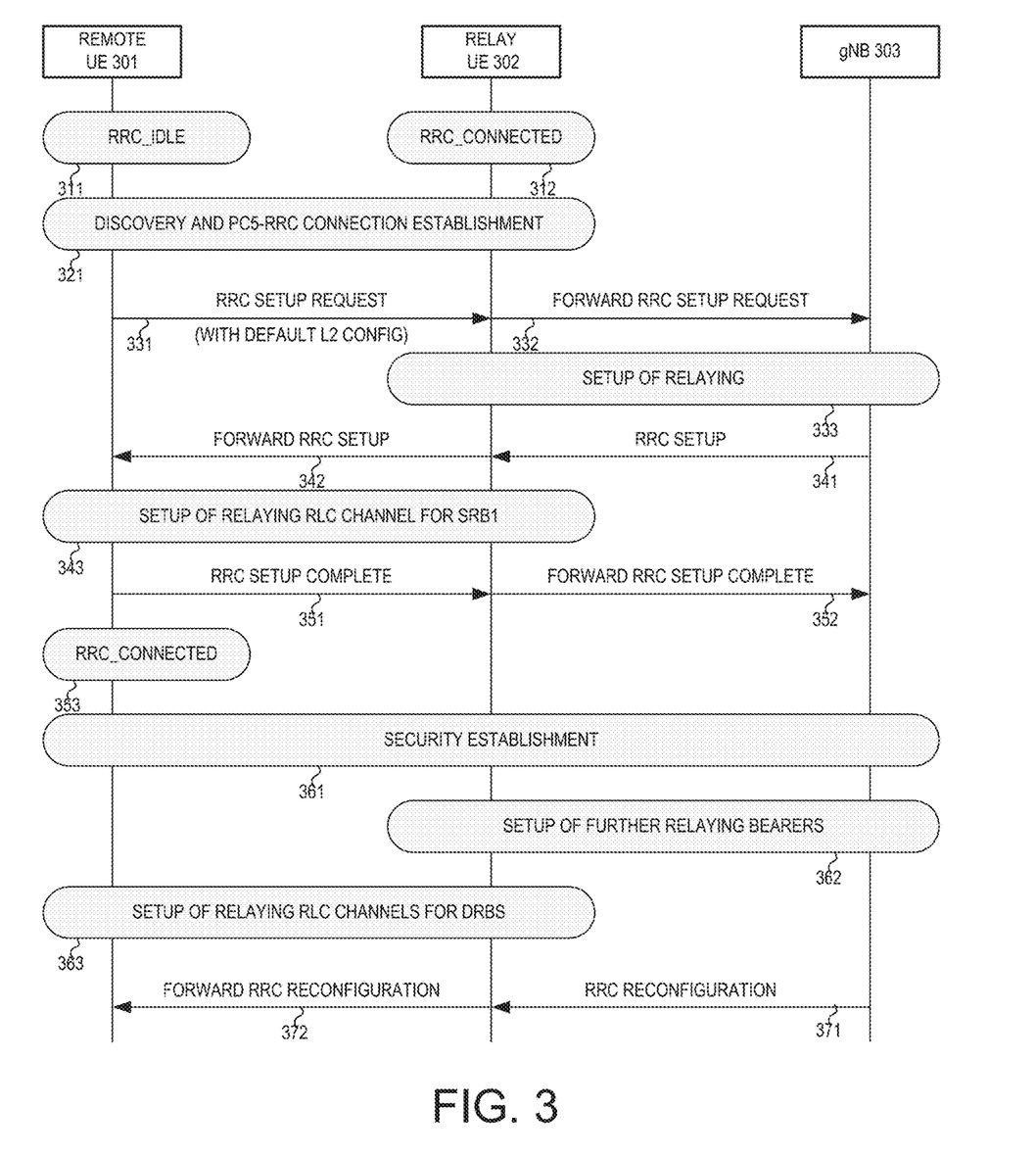
FIG. 3 illustrates a high level sequence flow of a UE-to-network relay for connection establishment in accordance with one novel aspect.

FIG. 3 illustrates a high level sequence flow of a UE-to-network relay for connection establishment in accordance with one novel aspect. In step 311, remote UE 301 is in RRC_IDLE state. (It is noted that a similar sequence may apply when the remote UE is initially in an RRC_INACTIVE state, but in such a case, the remote UE is performing a connection resume procedure rather than a connection establishment procedure.) In step 312, relay UE 302 is in RRC_CONNECTED state. Assume the remote UE does not first perform a random access channel (RACH) procedure on Uu to request a transfer to the relay link. This assumption would be necessary for the OOC UE (which physically cannot perform a RACH procedure due to the lack of a link to the gNB), and it could be beneficial also for a UE in poor Uu coverage, which are the cases most likely to need relaying. In step 321, the remote and relay UEs perform discovery according to the discovery procedure, and PC5-RRC connection establishment according to the legacy procedure. Step 321 may include providing a paging identifier, such as an NG-5G-S-TMSI of the remote UE, to the relay UE, to allow the relay UE to configure itself to monitor paging occasions for the remote UE. This facility will not be needed in the rest of this analysis (since we assume the remote UE establishes an RRC connection of its own accord), but may be necessary in case the remote UE performs discovery, selects the relay UE, and then remains in an RRC_IDLE or RRC_INACTIVE state. If the relay UE remains in an RRC_IDLE or RRC_INACTIVE state after selecting the relay UE, it may subsequently receive a paging message from the network, forwarded by the relay UE. In legacy operation on the Uu interface, receiving a paging message causes the UE to trigger an RRC connection establishment procedure to respond to the page. In the relaying case, the remote UE can similarly respond to the page by triggering an RRC connection establishment through the relay UE, that is, by pursuing the remaining steps of this procedure.

In step 331, remote UE 301 sends a message requesting setup of the connection (for instance, an RRCSetupRequest message of an RRC protocol) to gNB 303 via relay UE 302, using a default L2 configuration on PC5 (which may be possible to override with a configuration), and using some form of dedicated signalling by the relay UE on Uu (for example, a message of an RRC protocol as discussed below). The transmission from the remote UE towards the network alerts relay UE 302 that relaying needs to be set up with gNB 303. For purposes of FIG. 3, relay UE 302 starts in an RRC_CONNECTED state. However, if relay UE 302 starts in an RRC_IDLE or RRC_INACTIVE state instead, then relay UE 302 needs to establish an RRC connection. This can be done by applying well-known procedures for connection establishment on the Uu interface.

Next, relay UE 302 and gNB 303 perform a relaying setup procedure, through step 332 and step 333. In step 332, relay UE 302 transmits a suitable message, such as a UEAssistanceInformation (UAI) message or a SidelinkUEInformation (SUI) message of an RRC protocol, with a new field to indicate "I have a peer who requests relaying", together with a link-local ID of the remote UE (which may not be the same as the existing initialUE-Identity from the RRCSetupRequest message) and the RRCSetupRequest in a containerised format. For instance, the RRCSetupRequest may be encapsulated as a protocol data unit (PDU) of an RRC protocol inside the message transmitted by the relay UE, e.g., contained in the UAI/SUI message. The gNB needs to know the initialUE-Identity from the RRCSetupRequest message in case the remote UE is in coverage and already has an NG-5G-S-TMSI. If the remote UE selected a random ID for the initialUE-Identity, it is a new UE for the serving system (i.e., it is performing an initial attach procedure or coming from CCC), but the random ID is not actually used for anything. The network response is an RRCReconfiguration to the relay UE, with a configuration for the remote UE's signalling radio bearer 1 (SRB1). In some embodiments, the gNB may dictate the PC5 L2 configuration in its entirety, while in other embodiments, the gNB may give the higher-layer configuration and allow the relay UE to determine how to configure the RLC channel for SRB1.

In step 341, gNB 303 sends an RRCSetup message to remote UE 301, which is forwarded by relay UE 302 in step 342, the RRCSetup message contains at least the radioBearerConfig field. Note that the gNB can send the RRCSetup message to the relay UE, and the RRCSetup message can be containerised (for instance, encapsulated as a PDU of an RRC protocol inside a message of a PC5-RRC protocol) and sent along with the RLC channel configuration in step 343. The RRCSetup delivery to the remote UE uses the default configuration for L2 on PC5. It is noted that the masterCellGroup is a mandatory field in the RRCSetup message, containing the IE CellGroupConfig, which may not be meaningful to a remote UE, since the remote UE has no lower-layer configuration shared with the network that could define a cell group. However, the only mandatory field in CellGroupConfig is the cellGroupId, which in this scenario should always be set to a known value (for instance, the value 0 indicating a master cell group). The gNB can send a limited form of the RRCSetup containing the radioBearerConfig and only the cellGroupId of the masterCellGroup. In step 343, relay UE 302 configures an RLC channel for relaying of SRB1 towards remote UE 301. The remote UE sends an RRCSetupComplete message to the gNB in step 351, which is forwarded by the relay UE (using SRB1) in step 352. In step 353, remote UE 301 enters an RRC_CONNECTED state.

In step 361, remote UE 301 and gNB 303 establish security as usual (security messages forwarded through the relay on SRB1). In step 362, gNB 303 configures relay UE 302 with the configuration of additional radio bearers for relaying. In step 363, relay UE 302 configures remote UE 301 with the needed PC5 RLC channels for the additional bearers. In step 371, gNB 303 sends an initial RRCReconfiguration to the remote UE after SRB1 establishment, which is forwarded by the relay UE in step 372, to set up data radio bearers (DRBs). The step 372 may require setting up additional RLC channels between the remote and relay UEs. Alternatively, the relay UE 302 may be previously informed of the needed configuration, for example as part of step 333, and set up the RLC channels with the remote UE 301 in advance of the step 372.

Figure 4:
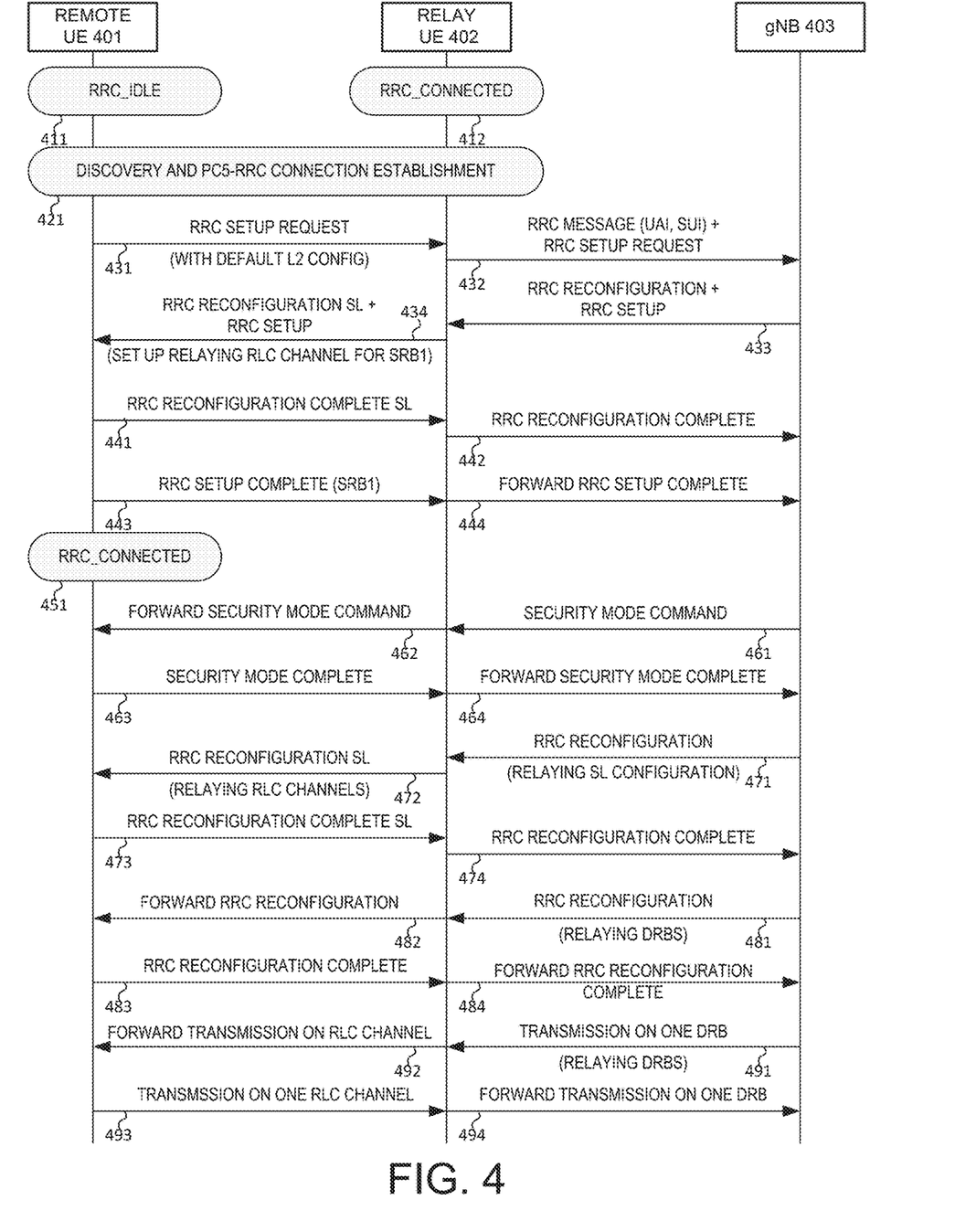
FIG. 4 illustrates a detailed message sequence flow of a UE-to-network relay for connection establishment in accordance with one novel aspect.

FIG. 4 illustrates a detailed message sequence flow of a UE-to-network relay for connection establishment in accordance with one novel aspect. In step 411, remote UE 401 is in RRC_IDLE. (It is noted that a similar sequence may apply in case remote UE 401 is in an RRC_INACTIVE state, but in this case, remote UE 401 will execute a connection resume procedure rather than a connection setup procedure.) In step 412, relay UE 402 is in RRC_CONNECTED state. In step 421, the remote and relay UEs perform discovery according to the discovery procedure, and PC5-RRC connection establishment according to the legacy procedure. In step 431, remote UE 401 sends an RRCSetupRequest message to relay UE 402 using the default L2 configuration on PC5. In step 432, relay UE 402 sends an RRC message (e.g. a UAI or SUI) to gNB 403 to convey the information that it has a peer UE that requests relaying, along with the containerised RRCSetupRequest from step 431.

In step 433, gNB 403 sends an RRCReconfiguration message to relay UE 402 containing the sidelink configuration for the relaying SRB1, along with a containerised RRCSetup message for remote UE 401. In some embodiments, the RRCReconfiguration message from the gNB may dictate the entire sidelink configuration, while in other embodiments, the RRCReconfiguration message from the gNB may configure only certain parameters, leaving others for the relay UE to determine autonomously. The RRCSetup message may contain only a restricted set of fields, such as the radioBearerConfig and the cellGroupId of the masterCellGroup, as discussed under step 341 of FIG. 3. In step 434, relay UE 402 sends a message (for instance, an RRCReconfigurationSidelink message of a PC5-RRC protocol) to remote UE 401 to set up the sidelink RLC channel for relaying SRB1, along with the containerised RRCSetup from step 433.

In step 441, remote UE 401 processes the RRCReconfigurationSidelink message and sends a completion message (for example, an RRCReconfigurationCompleteSidelink message) to relay UE 402, in response to step 434. In step 442, relay UE 402 sends a completion message (for example, an RRCReconfigurationComplete message) to gNB 403, in response to step 433. Step 442 may take place before or after step 441. That is, in some embodiments, the relay UE may indicate completion of its own reconfiguration procedure before it receives confirmation that the remote UE has completed its reconfiguration procedure. In step 443, remote UE 401 processes the RRCSetup message and sends a completion message (for example, an RRCSetupComplete message) on SRB1 to the gNB, which is forwarded by the relay UE in step 444. In step 451, remote UE 401 enters an RRC_CONNECTED state.

In step 461, gNB 403 sends a SecurityModeCommand to remote UE 401, which is forwarded by relay UE 402 on SRB1 in step 462, to establish security. In step 463, remote UE 401 sends a SecurityModeComplete to gNB 403, which is forwarded by relay UE 402 on SRB1 in step 464. In step 471, gNB 403 sends an RRCReconfiguration message to relay UE 402 containing the sidelink configuration for the relaying DRBs, including bearer mapping information. In some embodiments, the RRCReconfiguration message from the gNB may dictate the entire sidelink configuration, while in other embodiments, the RRCReconfiguration message from the gNB may configure only certain parameters, leaving others for the relay UE to determine autonomously. In step 472, relay UE 402 sends an RRCReconfigurationSidelink message to remote UE 401 to set up the sidelink RLC channels for relaying DRBs. In step 473, remote UE 401 sends an RRCReconfigurationCompleteSidelink message to relay UE 402 in response to step 472. In step 474, relay UE 402 sends an RRCReconfigurationComplete message to gNB 403, in responsive to step 471. In some embodiments, step 474 may take place before step 473. In step 481, gNB 403 sends an RRCReconfiguration message to remote UE 401, which is forwarded by the relay UE in step 482, to set up the relaying DRBs. In step 483, remote UE 401 sends an RRCReconfigurationComplete message to gNB 403, which is forwarded by the relay UE in step 484, in response to step 481. To summarize, the above-illustrated connection establishment procedure using UE-to-network relay may require the following modifications to the current 3GPP specification. In step 431, the L2 default configuration for PC5 needs to be defined. In step 432, an RRC message (for example, the existing UAI or SUI, or a new RRC message) is added or enhanced for indicating the existence of a peer that needs relaying, along with carrying a containerized RRCSetupRequest message. In step 433, the RRCReconfiguration is enhanced with the addition of a container for the RRCSetup. In step 434, the RRCReconfigurationSidelink is enhanced with the addition of a container for the RRCSetup. The RRCSetup is constrained such that only the radioBearerConfig is included when it is used for relaying. In step 471, the RRCReconfiguration is enhanced with the necessary information to capture the bearer mapping between Uu DRBs of the remote UE and Uu RLC channels of the relay UE. Possibly a new field is added to SL-ConfigDedicatedNR for the RLC/MAC/PHY configuration of relaying bearers (alternatively, this aspect may be handled by the existing sl-PHY-MAC-RLC-Config, with some extension to associate the RLC channels being set up with end-to-end bearers). After the DRBs are configured, they can be used for exchange of data. In the downlink, in step 491, the relay UE receives, from the network node, a transmission for the remote UE on a Uu RLC channel corresponding to one of the one or more DRBs. In step 492, the relay UE forwards, to the remote UE, the transmission for the remote UE on one of the one or more RLC channels for the one or more DRBs. Similarly, in the downlink, in step 493, the relay UE receives, from the remote UE, a transmission for the gNB on one of the one or more RLC channels. In step 494, the relay UE forwards, to the gNB, the transmission for the gNB on one of the one or more DRBs of the remote UE. It is noted that steps 491/492 and 493/494 may not occur immediately after the establishment of the relaying DRBs in steps 481 through 484, and in some cases only steps 491/492 or steps 493/494 may occur, for instance, if data transmission on the concerned DRB is unidirectional between the remote UE and the gNB.

Figure 5A:
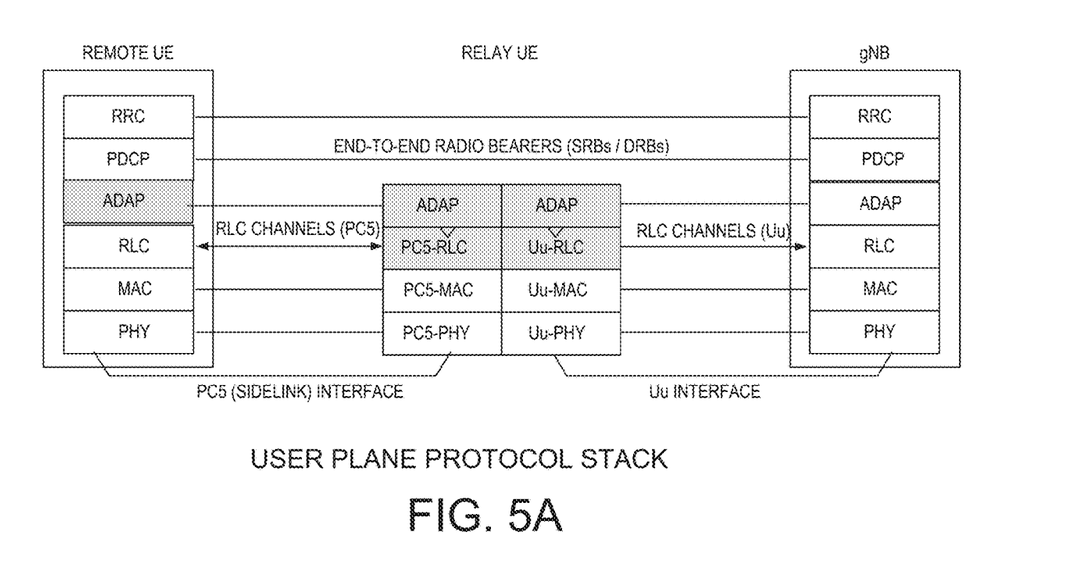
FIGS. 5A and 5B illustrate control plane and user plane protocol stacks for a layer 2 (L2) relaying architecture for UE-to-network relay in accordance with one novel aspect.
Figure 5B:
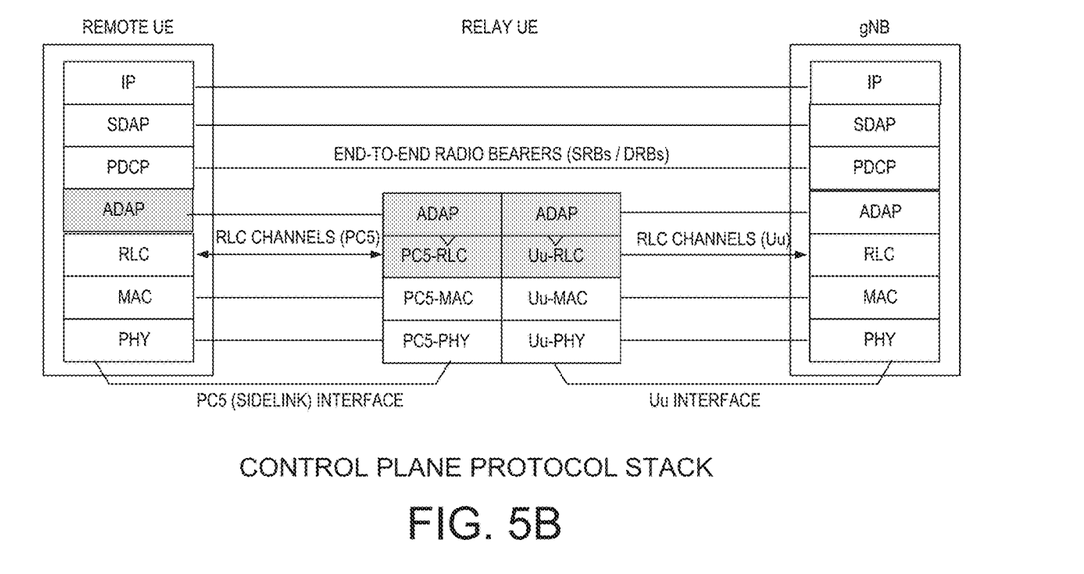

FIGS. 5A and 5B illustrate User Plane and Control Plane protocol stacks for a layer 2 (L2) relaying architecture for UE-to-network relay in accordance with one novel aspect. The relaying operation may occur at a Radio Link Control (RLC) sublayer of L2. Alternatively, the relaying operation may occur at an adaptation sublayer added between the RLC and a packet data convergence protocol (PDCP) sublayers of L2. The lower layers of the protocol stack, including a physical (PHY) layer, a medium access control (MAC) layer, and the RLC layer, are terminated between the relay UE and each remote UE, with service data units (SDUs) of the RLC protocol relayed between the two links at the relay UE. The upper layers of the protocol stack, including the PDCP layer, a service data adaptation protocol (SDAP) layer in the case of user plane (UP) operation, and upper layers that may comprise a radio resource control (RRC) protocol, are terminated end-to-end between remote UE and the network. This protocol stack is applicable to both control and user plane operation, with different upper-layer protocols for the two cases. In particular, the protocol stack allows for control and management of a RRC connection between the remote UE and the network, using the relay UE as a communications intermediary but without any involvement of the relay UE in the actual protocol operations for connection control. For example, remote UE may send RRC messages to the network (and vice versa) to configure aspects of a RRC connection, such as the configuration of the protocol stack, the configuration of radio bearers, and so on. Such RRC messages may be forwarded transparently by the relay UE.

Referring back to FIG. 4, the bearer mapping aspects of step 471 in FIG. 4 require some further discussion. In the downlink direction, it should be possible to map one or more radio bearers (SRBs/DRBs) of the remote UE to a specific RLC channel of the relay UE on the Uu interface (corresponding to a specific radio bearer of the relay UE), meaning that data of these remote UE bearers can share the same RLC configuration on Uu and be mapped to the appropriate RLC channels on the PC5 interface. Similarly, from the uplink perspective, it should be possible to map one or more PC5 RLC channels of the remote UE to one or more corresponding Uu RLC channels of the relay UE (corresponding to radio bearers of the relay UE). The Uu adaptation layer (between the relay UE and the gNB) can be used to describe this bearer mapping relation, according to a configuration delivered by the RRCReconfiguration message in step 471 of FIG. 4. Alternatively, the bearer mapping configuration may be delivered by a separate message from the gNB to the relay UE (not shown in the figures).

On the PC5 interface, a protocol such as a PC5-RRC protocol may provide a flexible way to map radio bearers of the remote UE to PC5 RLC channels for relaying. There are two alternatives for this mapping. Alternative 1: The mapping can be N:1, i.e., multiple radio bearers of the remote UE can be mapped to a single PC5 RLC channel. The mapping can be indicated by the adaptation layer between the relay UE and the gNB; for instance, in the downlink direction, an identifier of the radio bearer of the remote UE can be interpreted by the relay UE (according to the configuration received, for example, in step 471 of FIG. 4) as an indicator of which PC5 RLC channel should carry the data. It may then be necessary to have an adaptation layer between the remote UE and the relay UE, so that a packet on a particular PC5 RLC channel can be accompanied by an indication of which remote UE radio bearer the packet should be associated with. Alternative 2: The mapping can be 1:1, so that each remote UE radio bearer is mapped to a fixed PC5 RLC channel, which it does not share with any other remote UE radio bearer. In this case there may be no need for an adaptation layer between the remote UE and the relay UE, since the choice of PC5 RLC channel for transmission implicitly indicates the corresponding radio bearer of the remote UE.

In either case, the mapping can be configured by the relay UE to the remote UE using a control message, such as an RRCReconfigurationSidelink message of a PC5-RRC protocol. This configuration may correspond to step 363 of FIG. 3 and/or step 472 of FIG. 4. Alternatively, the mapping may be configured by a separate message between the relay and remote UEs, for example, after the illustrated step 483 of FIG. 4. For this latter alternative, an indication from the gNB to the relay UE would be needed after step 483 has completed, to notify the relay UE that the end-to-end radio bearers of the remote UE are established and the relay UE may configure the bearer mapping. The mapping may also be configured by the gNB itself, for example, as part of the reconfiguration message in step 481 of FIG. 4.

Figure 6:
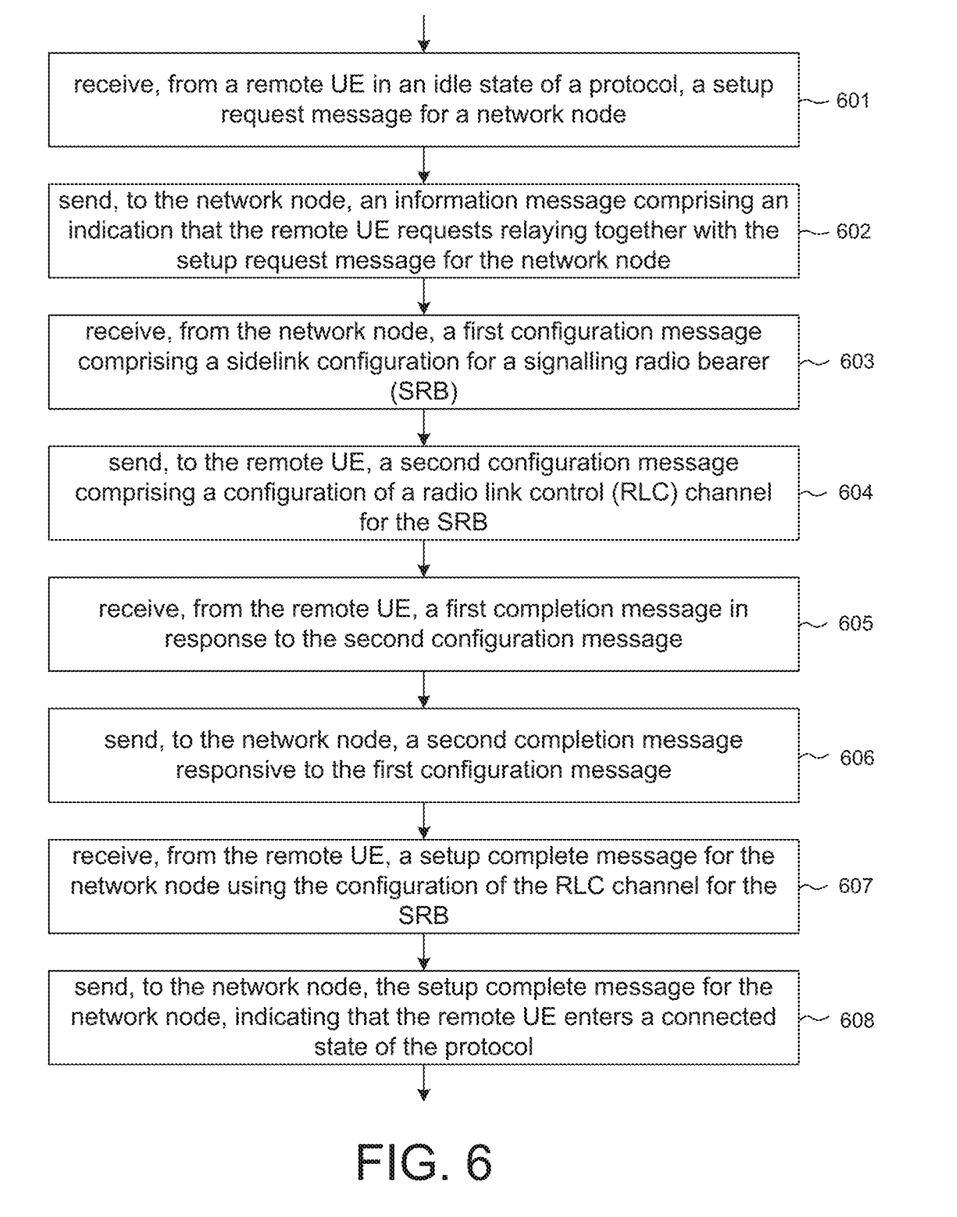
FIG. 6 is a flow chart of a method of connection establishment using UE-to-network relay from a relay UE perspective in accordance with one novel aspect.

FIG. 6 is a flow chart of a method of connection establishment using UE-to-network relay from a relay UE perspective in accordance with one novel aspect. In step 601, a relay UE receives, from a remote UE in an idle state of a protocol, a setup request message for a network node. In step 602, the relay UE sends, to the network node, an information message comprising an indication that the remote UE requests relaying together with the setup request message for the network node. In step 603, the relay UE receives, from the network node, a first configuration message comprising a sidelink configuration for a signalling radio bearer (SRB). In step 604, the relay UE sends, to the remote UE, a second configuration message comprising a configuration of a radio link control (RLC) channel for the SRB. In step 605, the relay UE receives, from the remote UE, a first completion message in response to the second configuration message. In step 606, the relay UE sends, to the network node, a second completion message responsive to the first configuration message. In step 607, the relay UE receives, from the remote UE, a setup complete message for the network node using the configuration of the RLC channel for the SRB. In step 608, the relay UE sends, to the network node, the setup complete message for the network node, indicating that the remote UE enters a connected state of the protocol.

Figure 7:
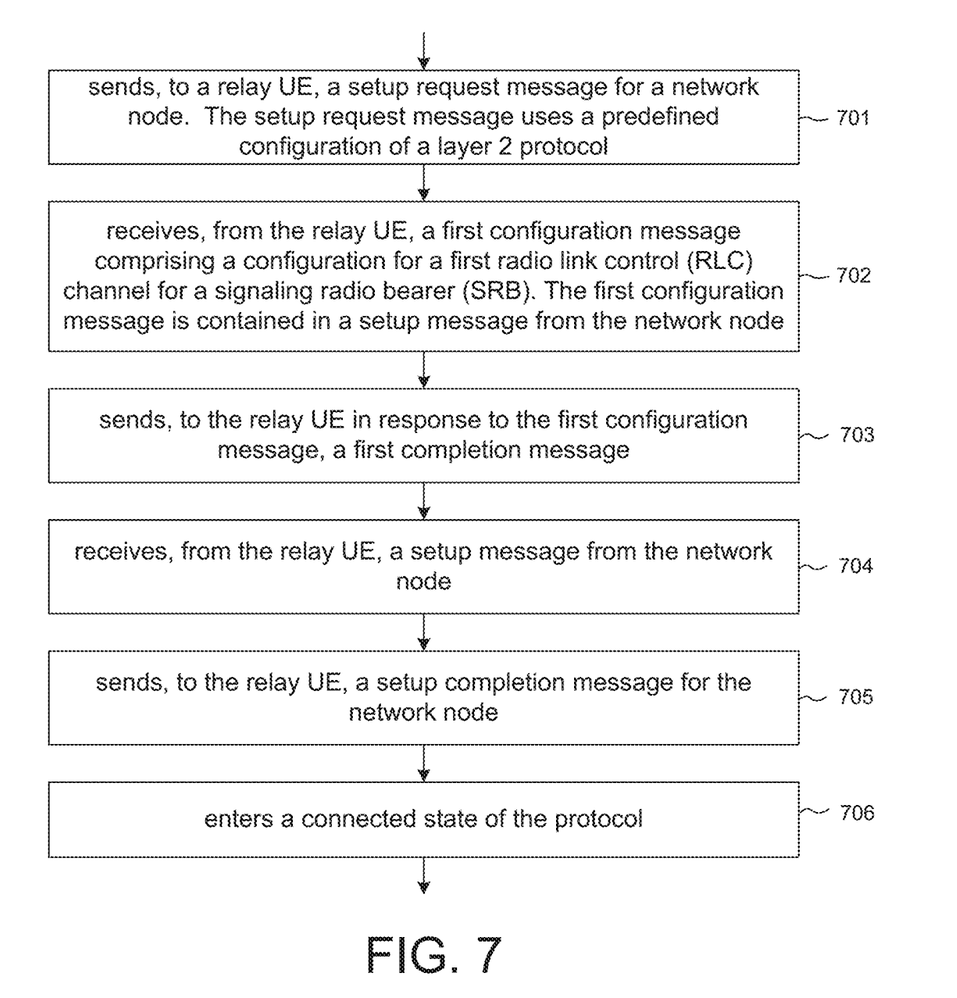
FIG. 7 is a flow chart of a method of connection establishment using UE-to-network relay from a remote UE perspective in accordance with one novel aspect.

FIG. 7 is a flow chart of a method of connection establishment using UE-to-network relay from a remote UE perspective in accordance with one novel aspect. In step 701, a remote UE sends, to a relay UE, a setup request message for a network node. The setup request message uses a predefined configuration of a layer 2 protocol. In step 702, the remote UE receives, from the relay UE, a first configuration message comprising a configuration for a first radio link control (RLC) channel for a signaling radio bearer (SRB). The first configuration message is contained in a setup message from the network node. In step 703, the remote UE sends, to the relay UE in response to the first configuration message, a first completion message. In step 704, the remote UE receives, from the relay UE, a setup message from the network node. In step 705, the remote UE sends, to the relay UE, a setup completion message for the network node. In step 706, the remote UE enters a connected state of the protocol.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of connection establishment operable by a relay User Equipment (UE), comprising:
   receiving, from a remote UE in an idle state of a protocol, a setup request message for a network node;
   sending, to the network node, an information message comprising an indication that the remote UE requests relaying for the network node, wherein the information message is UEAssistanceInformation (UAI) message or a SidelinkUEInformation (SUI) message, and wherein the indication comprises an identity of the remote UE;
   receiving, from the network node, a first configuration message comprising a sidelink configuration for a signalling radio bearer (SRB);
   sending, to the remote UE, a second configuration message comprising a configuration of a radio link control (RLC) channel for the SRB;
   receiving, from the remote UE, a first completion message in response to the second configuration message;
   sending, to the network node, a second completion message responsive to the first configuration message;
   receiving, from the remote UE, a setup complete message for the network node using the configuration of the RLC channel for the SRB; and
   sending, to the network node, the setup complete message for the network node, wherein the setup complete message indicates that the remote UE enters a connected state of the protocol.

2. The method of claim 1, further comprising:
   receiving, from the network node, a third configuration message comprising a sidelink configuration for one or more data radio bearers (DRBs);
   sending, to the remote UE, a fourth configuration message comprising a configuration of one or more RLC channels for the one or more DRBs;
   receiving, from the remote UE, a third completion message in response to the fourth configuration message; and
   sending, to the network node, a fourth completion message in response to the third configuration message.

3. The method of claim 2, further comprising:
   receiving, from the network node, a message for the remote UE on the SRB; and
   transmitting, to the remote UE, the message for the remote UE on the RLC channel for the SRB.

4. The method of claim 2, further comprising:
   receiving, from the remote UE, a message for the network node on the RLC channel for the SRB; and
   transmitting, to the network node, the message for the network node on the SRB.

5. The method of claim 2, further comprising:
   receiving, from the network node, a transmission for the remote UE on one of the one or more DRBs; and transmitting, to the remote UE, the transmission for the remote UE on one of the one or more RLC channels for the one or more DRBs.

6. The method of claim 5, wherein the one of the one or more RLC channels is determined by a mapping from the one of the one or more DRBs.

7. The method of claim 2, further comprising:
receiving, from the remote UE, a transmission for the network node on one of the one or more RLC channels for the one or more DRBs; and
transmitting, to the network node, the transmission for the network node on one of the one or more DRBs of the remote UE.

8. The method of claim 7, wherein the one of the one or more DRBs is determined by a mapping from the one of the one or more RLC channels.

9. A relay user equipment (UE), comprising:
a receiver that receives, from a remote UE in an idle state of a protocol, a setup request message for a network node;
a transmitter that transmits, to the network node, an information message comprising an indication that the remote UE requests relaying for the network node, wherein the information message is UEAssistanceInformation (UAI) message or a SidelinkUEInformation (SUI) message, and wherein the indication comprises an identity of the remote UE;
the receiver that receives, from the network node, a first configuration message comprising a sidelink configuration for a signalling radio bearer (SRB);
the transmitter that transmits, to the remote UE, a second configuration message comprising a configuration of a radio link control (RLC) channel for the SRB;
the receiver that receives, from the remote UE, a first completion message in response to the second configuration message;
the transmitter that transmits, to the network node, a second completion message responsive to the first configuration message;
the receiver that receives, from the remote UE, a setup complete message for the network node using the configuration of the RLC channel for the SRB; and
the transmitter that transmits, to the network node, the setup complete message for the network node, wherein the setup complete message indicates that the remote UE enters a connected state of the protocol.

10. The relay UE of claim 9, further comprising:
the receiver that receives, from the network node, a third configuration message comprising a sidelink configuration for one or more data radio bearers (DRBs);
the transmitter that transmits, to the remote UE, a fourth configuration message comprising a configuration of one or more RLC channels for the one or more DRBs;
the receiver that receives, from the remote UE, a third completion message in response to the fourth configuration message; and
the transmitter that transmits, to the network node, a fourth completion message in response to the third configuration message.

11. The relay UE of claim 10, further comprising:
the receiver that receives, from the network node, a message for the remote UE on the SRB; and
the transmitter that transmits, to the remote UE, the message for the remote UE on the RLC channel for the SRB.

12. The relay UE of claim 10, further comprising:
the receiver that receives, from the remote UE, a message for the network node on the RLC channel for the SRB; and
the transmitter that transmits, to the network node, the message for the network node on the SRB.

13. The relay UE of claim 10, further comprising:
the receiver that receives, from the network node, a transmission for the remote UE on one of the one or more DRBs; and
the transmitter that transmits, to the remote UE, the transmission for the remote UE on one of the one or more RLC channels for the one or more DRBs.

14. The relay UE of claim 13, wherein the one of the one or more RLC channels is determined by a mapping from the one of the one or more DRBs.

15. The relay UE of claim 10, further comprising:
the receiver that receives, from the remote UE, a transmission for the network node on one of the one or more RCL channels for the one or more DRBs; and
the transmitter that transmits, to the network node, the transmission for the network node on one of the one or more DRBs.

16. The relay UE of claim 15, wherein the one of the one or more DRBs is determined by a mapping from the one of the one or more RLC channels.

17. A method of connection establishment operable by a remote User Equipment (UE), comprising:
sending, to a relay UE, a setup request message for a network node, wherein the setup request message uses a predefined configuration of a layer 2 protocol;
receiving, from the relay UE, a first configuration message comprising a configuration for a first relaying radio link control (RLC) channel for a signaling radio bearer (SRB), wherein the first configuration message is contained in a setup message from the network node in response to the relay UE sending an information message comprising an indication that the remote UE requests relaying for the network node, and wherein the information message is a UEAssistanceInformation (UAI) message or a SidelinkUEInformation (SUI) message, and wherein the indication comprises an identity of the remote UE;
sending, to the relay UE in response to the first configuration message, a first completion message;
receiving, from the relay UE, a setup message from the network node;
sending, to the relay UE, a setup completion message for the network node; and
entering a connected state of the protocol.

18. The method of claim 17, further comprising:
establishing security with the network node;
receiving, from the relay UE, a second configuration message comprising configuration information for one or more RLC channels for one or more data radio bearers (DRBs);
sending, to the relay UE in response to the second configuration message, a second completion message;
receiving, from the relay UE, a third configuration message from the network node, comprising configuration information for the one or more DRBs; and
sending, to the relay UE in response to the third configuration message, a third completion message for the network node.

19. The method of claim 17, wherein the establishing security comprises:

receiving, from the relay UE, a security command message from the network node;
applying a security configuration defined by the security command message; and
sending, to the relay UE, a security complete message for the network node.

20. The method of claim 17, further comprising:
performing a discovery procedure with the relay UE, wherein the discovery procedure comprises sending, to the relay UE, a paging identifier of the remote UE).

* * * * *